US012694813B2

(12) United States Patent
Mirel et al.

(10) Patent No.: US 12,694,813 B2
(45) Date of Patent: Jul. 28, 2026

(54) IR DROP COMPENSATION FOR LARGE OLED DISPLAY PANELS

(71) Applicant: Apple Inc., Cupertino, CA (US)

(72) Inventors: Ionut A Mirel, Cupertino, CA (US); Mahesh B Chappalli, San Jose, CA (US); Yao Shi, Sunnyvale, CA (US); Hyunwoo Nho, Palo Alto, CA (US); Patrick R Cruce, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/437,154

(22) Filed: Feb. 8, 2024

(65) Prior Publication Data

US 2025/0259582 A1 Aug. 14, 2025

(51) Int. Cl.
*G09G 5/10* (2006.01)
*G09G 3/20* (2006.01)
*G09G 3/3208* (2016.01)

(52) U.S. Cl.
CPC ......... *G09G 3/2007* (2013.01); *G09G 3/3208* (2013.01); *G09G 2320/0223* (2013.01); *G09G 2320/0266* (2013.01); *G09G 2360/16* (2013.01)

(58) Field of Classification Search
CPC ............... G09G 3/2007; G09G 3/3208; G09G 2320/0223; G09G 2320/0266; G09G 2360/16
USPC .......................................................... 345/690
See application file for complete search history.

(56) References Cited

U.S. PATENT DOCUMENTS

| | | | | |
|---|---|---|---|---|
| 10,790,351 | B2 | 9/2020 | Wang et al. | |
| 10,991,317 | B2 | 4/2021 | Byun | |
| 11,164,540 | B2 | 11/2021 | Holland et al. | |
| 11,302,264 | B2 | 4/2022 | Gao | |
| 11,645,533 | B2 | 5/2023 | Xie et al. | |
| 11,705,088 | B2 | 7/2023 | Furihata | |
| 2013/0139387 | A1* | 6/2013 | Anasis | F03D 80/50 29/889.1 |
| 2020/0082761 | A1* | 3/2020 | Kim | G09G 3/3233 |
| 2020/0143750 | A1* | 5/2020 | Gao | H10K 59/121 |
| 2022/0415240 | A1* | 12/2022 | Park | G09G 3/2007 |
| 2023/0089942 | A1 | 3/2023 | Shi et al. | |
| 2023/0139387 | A1 | 5/2023 | Jun | |

* cited by examiner

*Primary Examiner* — Jennifer T Nguyen
(74) *Attorney, Agent, or Firm* — Fletcher Yoder, P.C.

(57) ABSTRACT

Variation in IR drop across the electronic display may result in display pixels that are intended to be programmed with the same image data to behave differently, resulting in visible image artifacts. The current drawn by the intensity of the display pixels displaying an aggressor image may cause a voltage (IR) drop across a non-aggressing (or victim) portion of the display. This IR drop across the electronic display may result in a visible image artifact, such as a transition band across the non-aggressing portion of the electronic display. To reduce or eliminate image artifacts, IR drop compensation may be provided to the electronic display. The IR drop compensation may be determined on a per-zone basis based on present frame average pixel luminance (APL), previous frame APL, and IR drop due to each respective zone in a plurality of zones across the electronic display.

20 Claims, 12 Drawing Sheets

IR DROP COMPENSATION FOR LARGE OLED DISPLAY PANELS

BACKGROUND

This disclosure relates to systems and methods for improving electronic display performance by mitigating and reducing IR drop across the electronic display.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Many electrical signals are provided to an electronic display to enable the electronic display to display images, including various power signals and data signals. The further the electrical signals travel in the electronic display, the greater the likelihood of IR drop due to the resistance of the signal-carrying wires in the electronic display. Indeed, as display panels becomes larger and larger, the magnitude of the IR drop may become greater, and thus addressing IR drop becomes more significant. The variation in IR drop across the electronic display may result in display pixels that are intended to be programmed with the same image data to behave differently, resulting in visible image artifacts.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
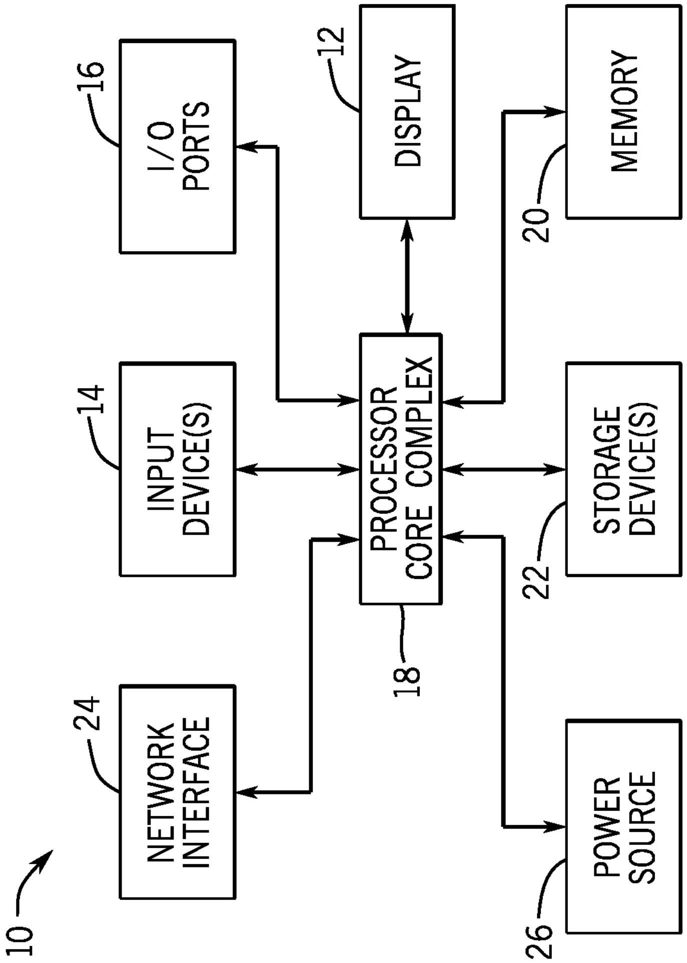
FIG. 1 is a block diagram of an electronic device that includes an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Many electrical signals are provided to an electronic display to enable the electronic display to display images, including various power signals and data signals. The further the electrical signals travel in the electronic display, the greater the likelihood of IR drop due to the resistance of the signal-carrying wires in the electronic display. Indeed, as display panels becomes larger and larger, the magnitude of the IR drop may become greater, and thus addressing IR drop becomes more significant. The variation in IR drop across the electronic display may result in display pixels that are intended to be programmed with the same image data to behave differently, resulting in visible image artifacts.

IR drop may vary depending on the content on the electronic display. Consider an example in which an OLED display may display an image including a bright white band across the bottom 25% (e.g., the aggressor image) of the electronic display and less bright emission for the remaining 75% of the display. The current drawn by the intensity of the display pixels displaying the aggressor image at the bottom 25% of the screen may cause a voltage drop due to the current being drawn across the inherent impedance of the power rails according to Ohm's law (V=I×R). This voltage (IR) drop across the electronic display may result in a visible image artifact, such as a transition band across the non-aggressing portion of the electronic display. However, the IR drop at any display pixel or group of display on the electronic display may be due not only to distance from a voltage supply, but due to the content presently displayed on the electronic display, the content previously displayed (e.g., in a previous image frame) on the electronic display, and the IR experienced by other display pixels or groups of display pixels in the electronic display, as well as other factors.

Due to the variety of factors that may influence and impact the IR drop of a display pixel, to obtain an accurate IR drop estimation, the electronic display may be divided into rows and columns of zones. IR drop may be determined at each zone based on the content presently and previously displayed on the electronic display. To account for the IR drop due to the present image frame data, average pixel luminance (APL) for each zone may be determined for each zone based on the present image frame. To account for the IR drop due to the previous image frame data, a delta between the previous frame APL and present frame APL may be determined for each zone. In some embodiments, previous frame APL and present frame APL may be determined for each line of display pixels within a respective zone (e.g., each subline of display pixels). The delta subline APLs in the respective zone may be accumulated to determine delta zone APL. To account for the impact that each zone has on all other zones in the electronic display, an IR drop grid map may be generated based on the IR drop due to each respective zone. All IR drop grid maps may be accumulated to determine IR drop across the electronic display.

With the foregoing in mind, FIG. 1 is an example electronic device 10 with an electronic display 12 having independently controlled color component illuminators (e.g., projectors, backlights, etc.). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a BLUETOOTH® network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch-sensing components that enable user inputs to the electronic device 10 by detecting the occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). Although sometimes used to refer to a collection of sub-pixels (e.g., red, green, and blue subpixels) as used herein, the terms display pixel or pixel may refer to an individual sub-pixel (e.g., red, green, or blue subpixel).

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
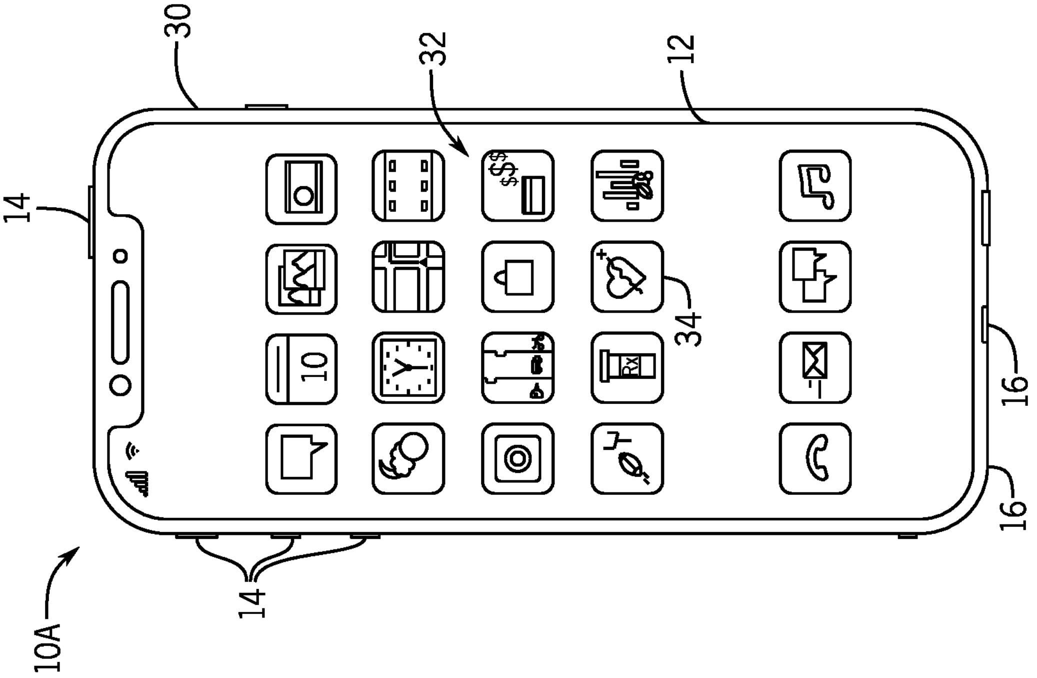
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
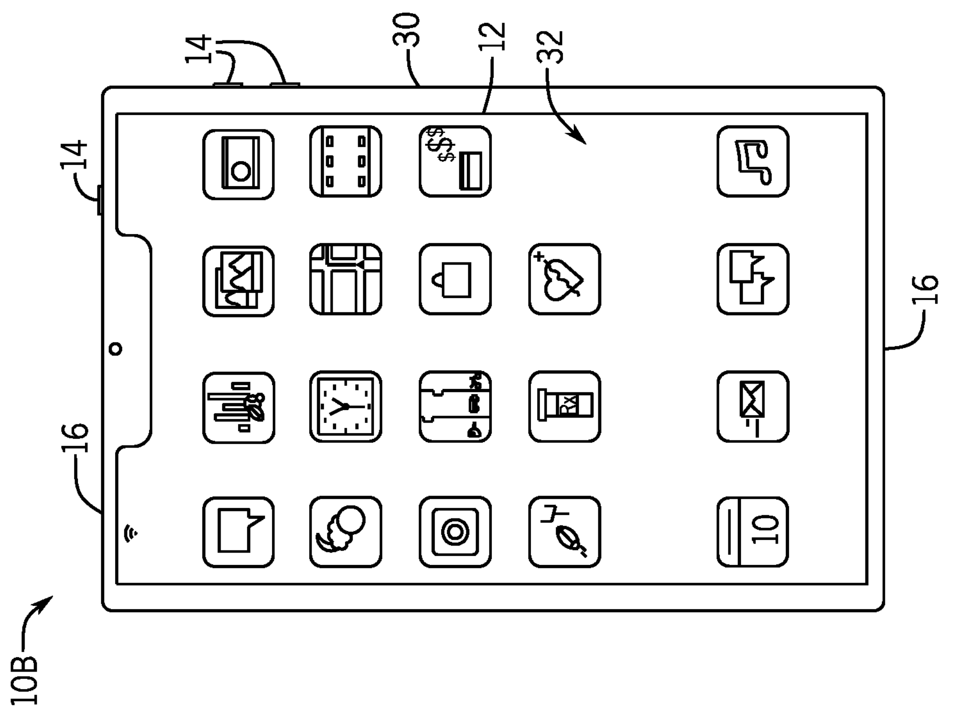
FIG. 3 is another example of the electronic device of FIG. 1 in the form of a tablet device, in accordance with an embodiment.
Figure 4:
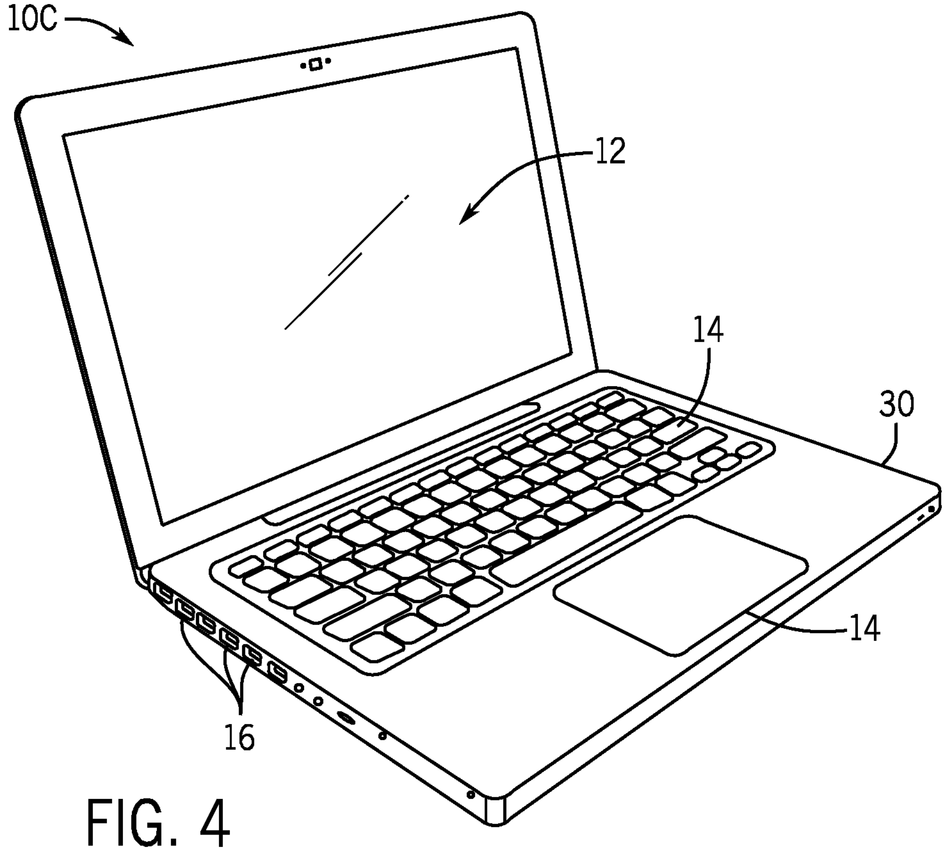
FIG. 4 is another example of the electronic device of FIG. 1 in the form of a computer, in accordance with an embodiment.
Figure 5:
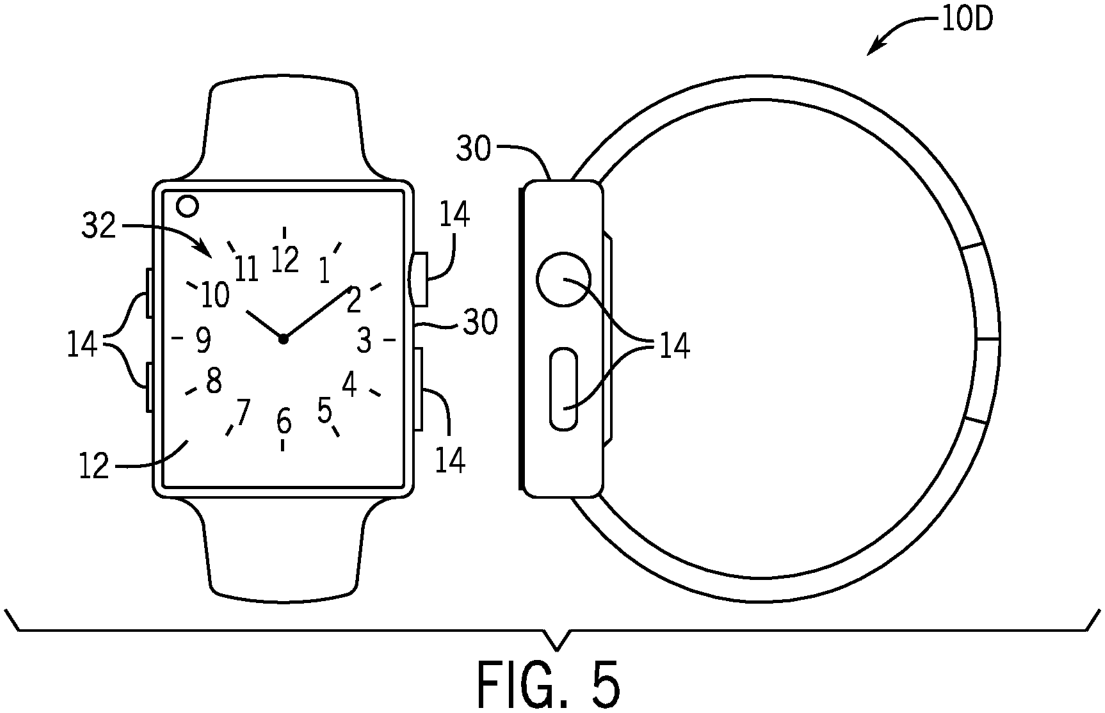
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C (e.g., notebook computer), is shown in FIG. 4. By way of example, the computer 10C may be any MACBOOK® model available from Apple Inc. Another example of a suitable electronic device 10 (e.g., a worn device), specifically a watch 10D, is shown in FIG. 5. By way of example, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
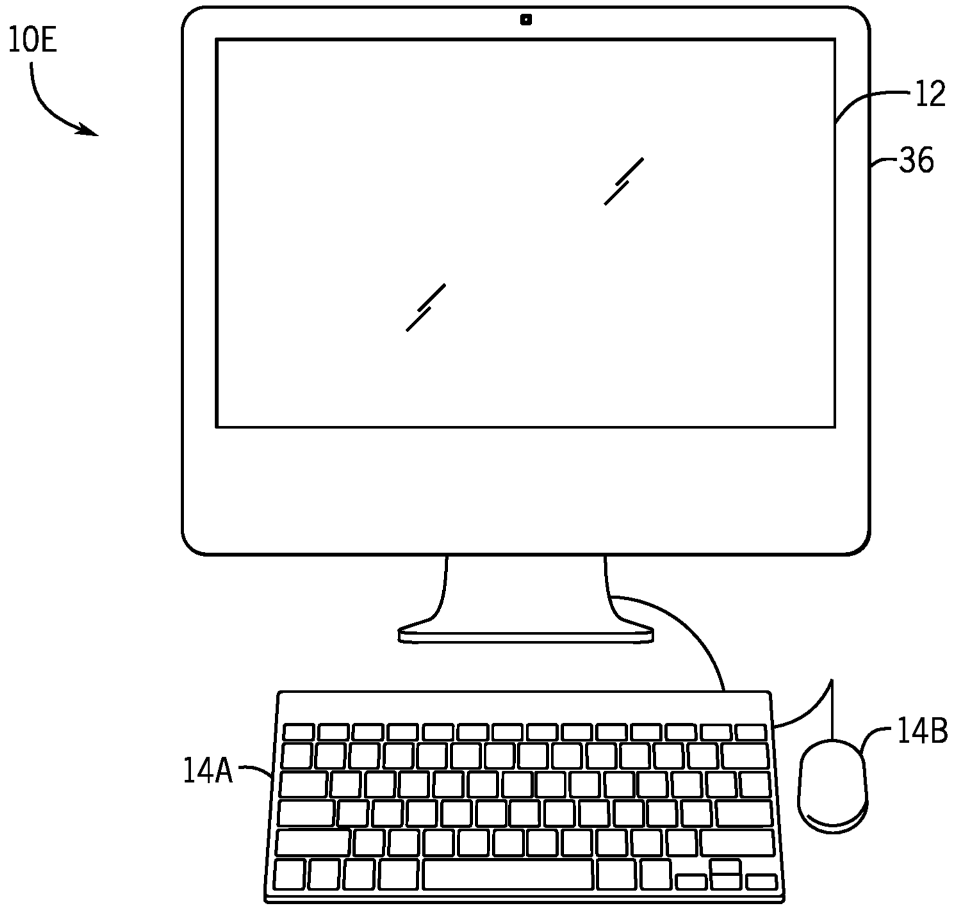
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer or a server, but may also be a standalone media player or video gaming machine. By way of example, the computer 10E may be an IMAC® or other device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

Figure 7:
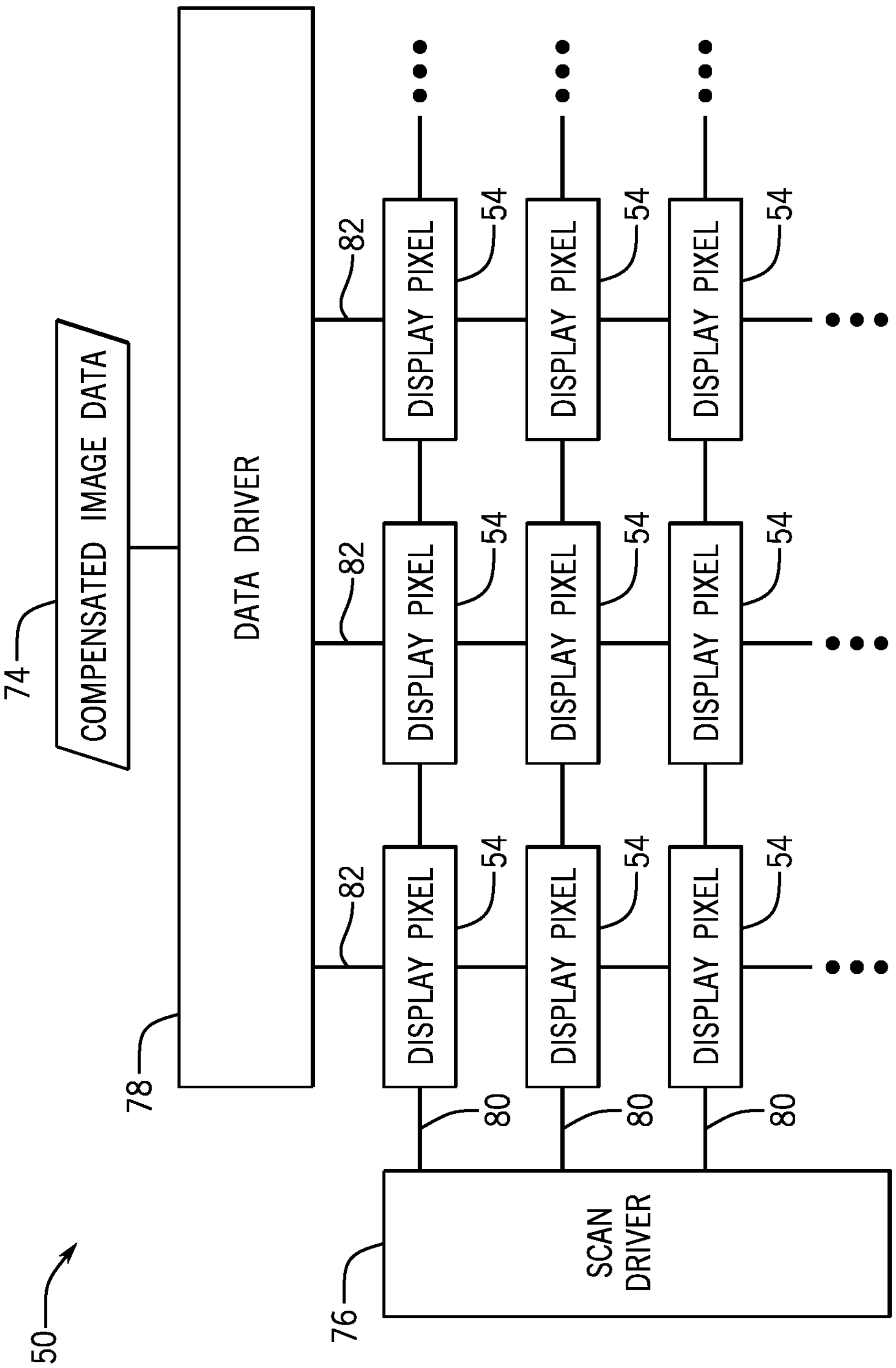
FIG. 7 is a block diagram of a display pixel array of the electronic display of FIG. 1.

FIG. 7 is a block diagram of a display pixel array 50 of the electronic display 12. It should be understood that, in an actual implementation, additional or fewer components may be included in the display pixel array 50.

The electronic display 12 may receive compensated image data 74 for presentation on the electronic display 12. The electronic display 12 includes display driver circuitry that includes scan driver circuitry 76 and data driver circuitry 78. The display driver circuitry controls programing the compensated image data 74 into the display pixels 54 for presentation of an image frame via light emitted according to each respective bit of compensated image data 74 programmed into one or more of the display pixels 54.

The display pixels 54 may each include one or more self-emissive elements, such as a light-emitting diodes (LEDs) (e.g., organic light emitting diodes (OLEDs) or micro-LEDs (μLEDs)), however other pixels may be used with the systems and methods described herein including but not limited to liquid-crystal devices (LCDs), digital mirror devices (DMD), or the like, and include use of displays that use different driving methods than those described herein, including partial image frame presentation modes, variable refresh rate modes, or the like.

Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use red (R), green (G), blue (B), or others.

The scan driver circuitry 76 may provide scan signals (e.g., pixel reset, data enable, on-bias stress) on scan lines 80 to control the display pixels 54 by row. For example, the scan driver circuitry 76 may cause a row of the display pixels 54 to become enabled to receive a portion of the compensated image data 74 from data lines 82 from the data driver circuitry 78. In this way, an image frame of the compensated image data 74 may be programmed onto the display pixels 54 row by row. Other examples of the electronic display 12 may program the display pixels 54 in groups other than by row.

Figure 8:
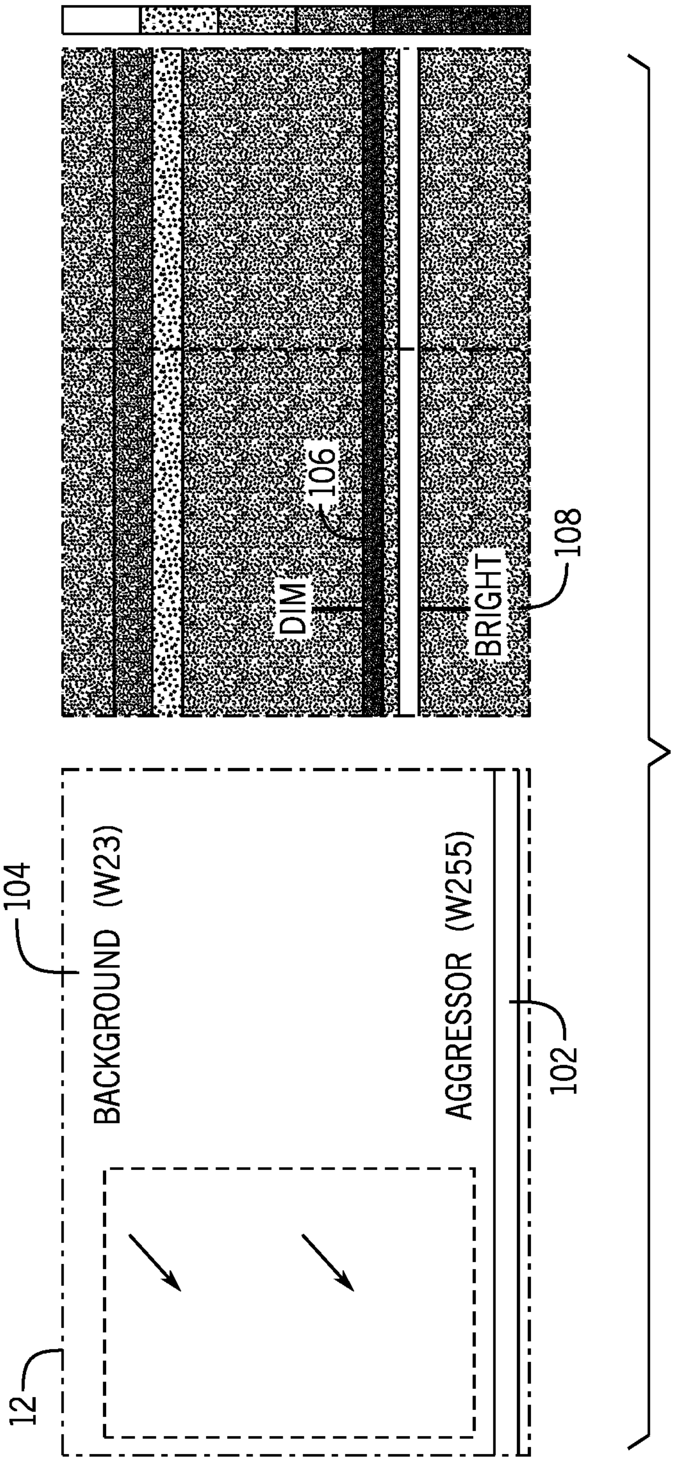
FIG. 8 illustrates an electronic display displaying an image including an aggressor image across the bottom of the electronic display and a resulting victim image, in accordance with an embodiment.

As previously discussed, variation in IR drop across the electronic display may result in display pixels that are intended to be programmed with the same image data to behave differently, resulting in visible image artifacts. FIG. 8 illustrates an electronic display 12 displaying an image including a bright white band across the bottom of the electronic display 12 (e.g., the aggressor image 102) and a resulting less bright emission for the remaining portion (e.g., the victim image 104) of the electronic display 12. The current drawn by the intensity of the display pixels 54 displaying the aggressor image 102 of the screen may cause a voltage drop according to Ohm's law (V=I×R). This voltage (IR) drop across the electronic display 12 (e.g., the victim image 104 of the electronic display 12) may result in a visible image artifact, such as a transition band across the non-aggressing portion of the electronic display. The dim band 106 and the bright band 108 illustrate transition bands that may appear as image artifacts on the electronic display 12. To reduce or eliminate image artifacts, IR drop compensation may be provided to the electronic display 12. It should be noted that while only one aggressor image 102 is shown, there may be multiple aggressor images 102 across the electronic display 12 of varying sizes and intensities.

As will be discussed in greater detail below, IR drop may be determined at discrete calibration points across the electronic display (e.g., via the processor core complex 18), average pixel luminance (APL) values may be generated based on the IR drop at the calibration points, and the APL values may be used to convert the voltage at each calibration point into image-specific IR drop information used to compensate for the IR drop across the electronic display.

I. IR-Drop Compensation

As previously mentioned, many electrical signals are provided to the electronic display 12 to enable the electronic display 12 to display images, including various power signals and data signals. The further the electrical signals travel in the electronic display, the greater the likelihood of IR drop due to the resistance of the signal-carrying wires in the electronic display. Indeed, as display panels becomes larger and larger, the magnitude of the IR drop may become greater, and thus addressing IR drop becomes more significant. The variation in IR drop across the electronic display may result in display pixels that are intended to be programmed with the same image data behaving differently, resulting in visible image artifacts.

Pixel IR drop impacts pixel luminance, as the IR drop profile across the electronic display 12 depends on content and panel brightness. Brightness changes in already bright panel regions may affect the luminance or gamma in other regions. This IR drop may be compensated by measuring the influence of the image content to the voltage drop across the electronic display 12.

To compensate for IR drop across the electronic display 12, an accurate IR drop estimate may be determined for the electronic display 12. To determine IR drop, the electronic display 12 may be divided into a grid of rectangular, non-overlapping, and non-uniformly distributed zones. The zones may cover displays of any size and in any number of rows and columns. For example, the zones may be divided into a 10×20 grid including 10 rows of 20 columns, a 10×10 grid, or any appropriate grid size.

Figure 9:
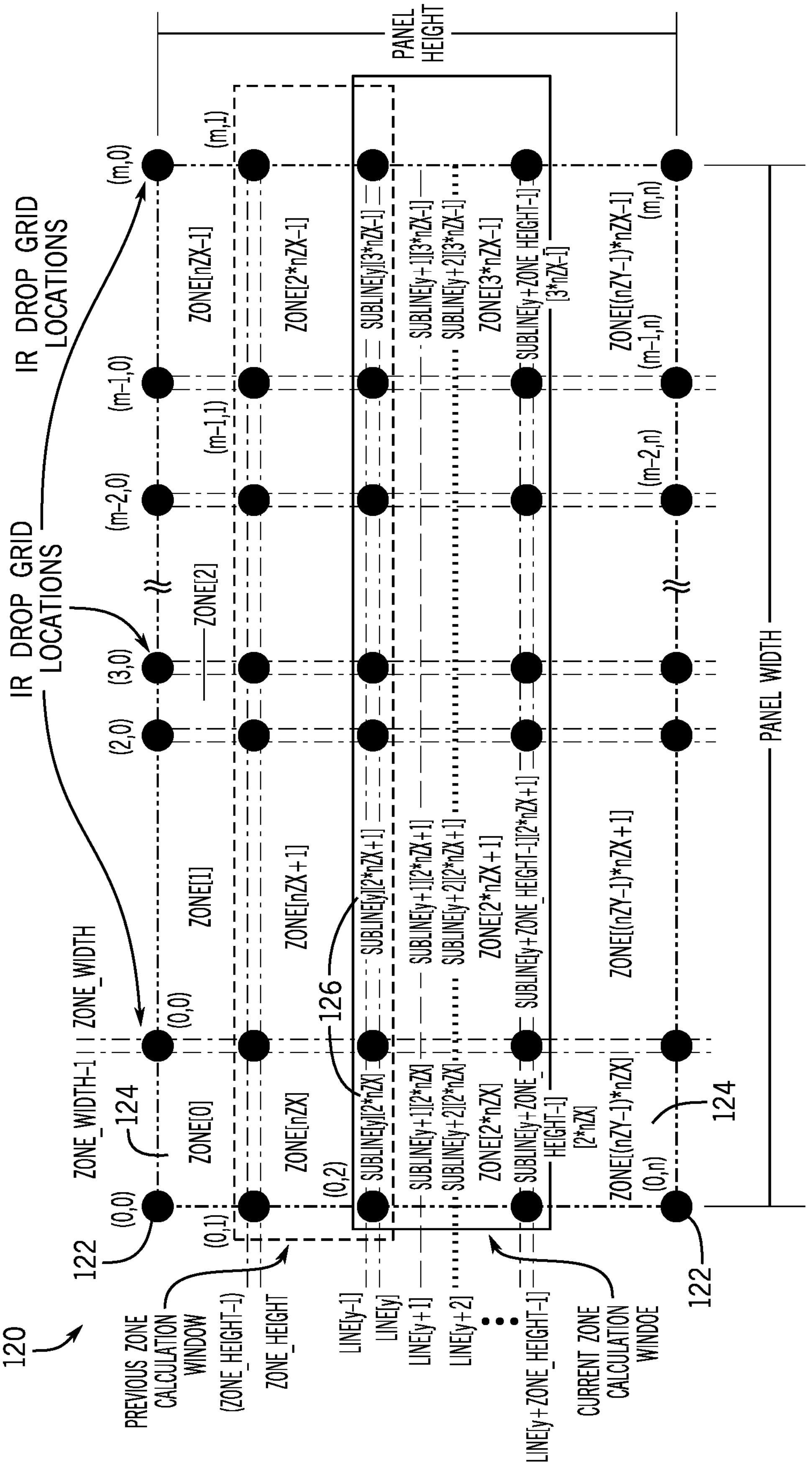
FIG. 9 is a schematic diagram of a grid map of the electronic display divided into rows and columns of zones based on the location of calibration points across the electronic display, in accordance with an embodiment.

FIG. 9 is a schematic diagram of a grid map of the electronic display 12 divided into rows and columns of zones based on the location of calibration points across the electronic display 12, according to embodiments of the present disclosure. A grid map 120 includes a number of calibration points 122 disposed at corners (e.g., intersections) of rows and columns. The grid map may include any appropriate number of calibration points 122, such as 10×10, 20×10, 21×11, and so on. Between each four calibration points 122 lies a zone 124. The zones 124 may be arranged into rows and columns corresponding to the calibration points 122. Each zone 124 may include a plurality of display pixels 54 that may be programmed in rows of display pixels 54 called sublines 126. As will be discussed in greater detail below, the IR drop across the electronic display 12 may be determined by calculating APL values for the display pixels 54 in each zone 124.

Figure 10:
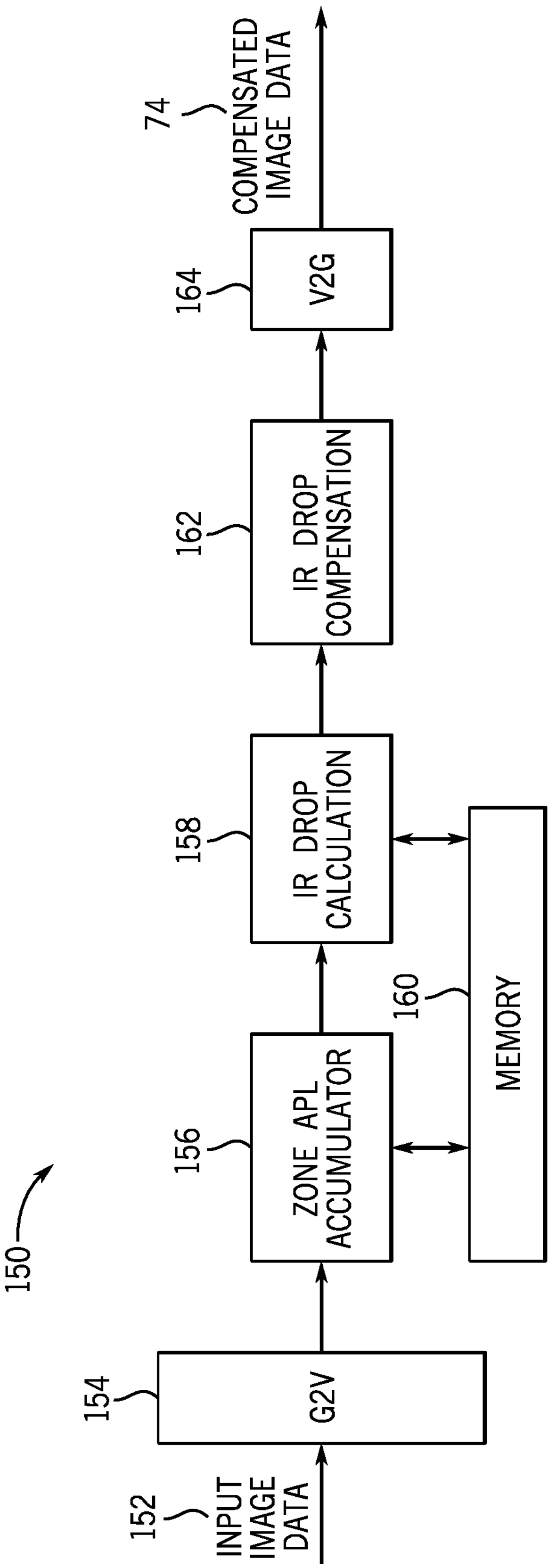
FIG. 10 is a block diagram of IR drop compensation (IRDC) circuitry, in accordance with an embodiment.

FIG. 10 is a block diagram of IR drop compensation (IRDC) circuitry 150, according to embodiments of the present disclosure. The IRDC circuitry 150 includes gray level to voltage (G2V) circuitry 154 that may receive input image data 152 (e.g., including a corresponding gray level) and convert the image data to corresponding voltage values. The IRDC circuitry 150 may determine average intensity of the display pixels 54 based on the voltage values. As OLED pixels are self-emissive, the intensity of the display pixels 54 will be based on the voltage and current provided to the display pixels 54. The voltage and current provided to the display pixels 54 may be content-dependent, and accordingly based on the image data.

The IRDC circuitry 150 may determine the APL for the display pixels 54 in each subline 126 of a corresponding zone 124 to generate subline APL. The IRDC circuitry 150 may receive the data pixels for each zone (e.g., at a subline granularity). The subline APL values for a present zone (e.g., Zone[0]) may be summed to generate a zone APL value. Once the zone APL for the Zone[0] is generated, the zone APL for Zone[0] may be stored in memory 160, and the IRDC circuitry 150 may move onto a subsequent zone within the present row of zones (e.g., Zone[1]). This process may continue until the last zone 124 of the row of zones (e.g., Zone[nZX−1]) is reached. The IRDC circuitry 150 may then move onto a subsequent row of zones, and determine zone APL for the first zone of the subsequent row of zones (e.g., Zone[nZX]). This process may be repeated for each row of zones 124 of the grid map 120.

The zone APL may enable the IRDC circuitry 150 to determine the amount of current that may be drawn over a portion of the electronic display 12 corresponding to one or more zones 124 for a given frame based on the content displayed on the electronic display as well as the content previously displayed in a previous frame. Indeed, the IR drop for a present frame currently being displayed or programmed into the sublines for a given row of zones may include the IR drop for the previous frame in addition to the previous IR drop contributions of the present frame. For example, if the sublines of the second row of zones (Zone [nZX] through Zone[2'nZX−1]) are presently being programmed, the IR drop calculated for all zones for the previous frame and the IR drop calculated for the first row of zones will be factored into the IR drop calculations for the second row of zones.

A variational or differential calculation may be used to determine the IR drop for a given frame currently being programmed into the display pixels 54. That is, deltas may be determined between the IR drop of the previous frame and the IR drop of the present frame at the same location (e.g., the same subline, the same zone). Using delta values may be advantageous as delta values are generally smaller than raw values. For example, the APL for a previous frame is determined, and a present frame (e.g., subsequent to the previous frame) is being programmed into the second row of zones beginning with the Zone[nZX]. The panel of the electronic display 12 programs in raster scan format, and thus the sublines 126 and rows of zones 124 above a present subline or a present row of zones may include the present frame information, while the sublines 126 and the rows of zones 124 below the present subline may include information from the previous frame, as the zones 124 and sublines 126 are programmed sequentially from top-to-bottom.

As the image data is scanned down the rows of zones 124, the calibration points 122 may be updated (e.g., via a lookup table (LUT) stored in memory) only for the present zone 124 being programmed. This may conserve processing power as only a portion of the calibration points 122 are being updated with each new zone 124 programmed, in contrast to all calibration points 122 across the grid map 120 being updated with each new zone 124 being programmed. As the subsequent rows of zones 124 are programmed with the input image data 152, the subsequent rows of zones 124 and the calibration points 122 are updated based on the IR drop information of the previous rows of zones 124. This is because the IR drop from the previous rows of zones 124 may impact the IR drop for all subsequent rows of zones 124.

The IRDC circuitry 150 may determine a subline APL for a given subline 126 of Zone[nZX] being programmed. To determine the delta subline APL for the given subline, the IRDC circuitry 150 may have temporarily stored the APL for the given subline for the previous frame, may determine the present subline APL for the given subline during a present frame, and may subtract the present subline APL (corresponding to the present frame) for the given subline from the previous subline APL (corresponding to an immediately previous frame) for the given subline to generate a delta subline APL for the given subline. The delta subline APL may be temporarily stored in the memory 160, and the present subline APL may be temporarily stored in the memory 160 for determining a subsequent delta subline APL for a subsequent frame. Once the last delta subline APL value for the given Zone[nZX] is calculated, the delta subline APL values may be accumulated to generate a delta zone APL value. The delta subline APL values may either be discarded or temporarily stored for determining deltas subline values of a subsequent frame, then discarded to reduce memory usage.

While the IRDC circuitry 150 is analyzing a present subline 126, the IRDC circuitry 150 may determine an IR drop for each display pixel 54 in the present subline 126. The IR drop compensation may be applied inside the row of zones 124. For each new subline 126, the IRDC circuitry 150 may will track where in the row of zones 124 the present subline 126 is located, so the IRDC circuitry 150 may know how many delta subline APLs have been calculated so far. When the IRDC circuitry 150 determines delta zone APL, the entire zone is taken into account, and IR drop information may be captured that was not captured by a dynamic raster scan. In this manner, the IRDC circuitry 150 may continuously be up to date on IR drop calculations for a given zone 124.

Based on the expected current drawn (e.g., determined by the zone APL), the IRDC circuitry 150 may determine an IR drop estimation for the portion of the electronic display 12. Zone APL accumulation circuitry 156 may receive the zone APL for all zones of the grid map 120 and accumulate (e.g., sum) the individual zone APL values to determine panel APL across the electronic display 12. IR drop calculation circuitry 158 may receive the panel APL values from the zone APL accumulation circuitry 156 and determine IR drop across the electronic display based on the panel APL values. The zone APL accumulation circuitry 156 and the IR drop calculation circuitry 158 may store subline APL values for a previous frame or a present frame, zone APL values for a previous frame or a present frame, delta values, and/or IR drop calculations determined with respect to the zones in the memory 160, as discussed above. The memory may include SRAM, DRAM, ROM, or any other appropriate memory structure.

Once the IR drop calculation circuitry 158 determines the IR drop for a portion or the entirety of the electronic display 12, IR drop compensation circuitry 162 determines and applies an IR drop compensation in the voltage domain (e.g., wherein the IR drop compensation includes compensated pixel voltage values) based on the IR drop calculation received from the IR drop calculation circuitry 158. Voltage-to-gray (V2G) conversion circuitry 164 converts the compensated pixel voltage values to the compensated image data 74 in the gray level domain, which is programmed into the display pixels 54, as described with respect to FIG. 7.

Figure 11:
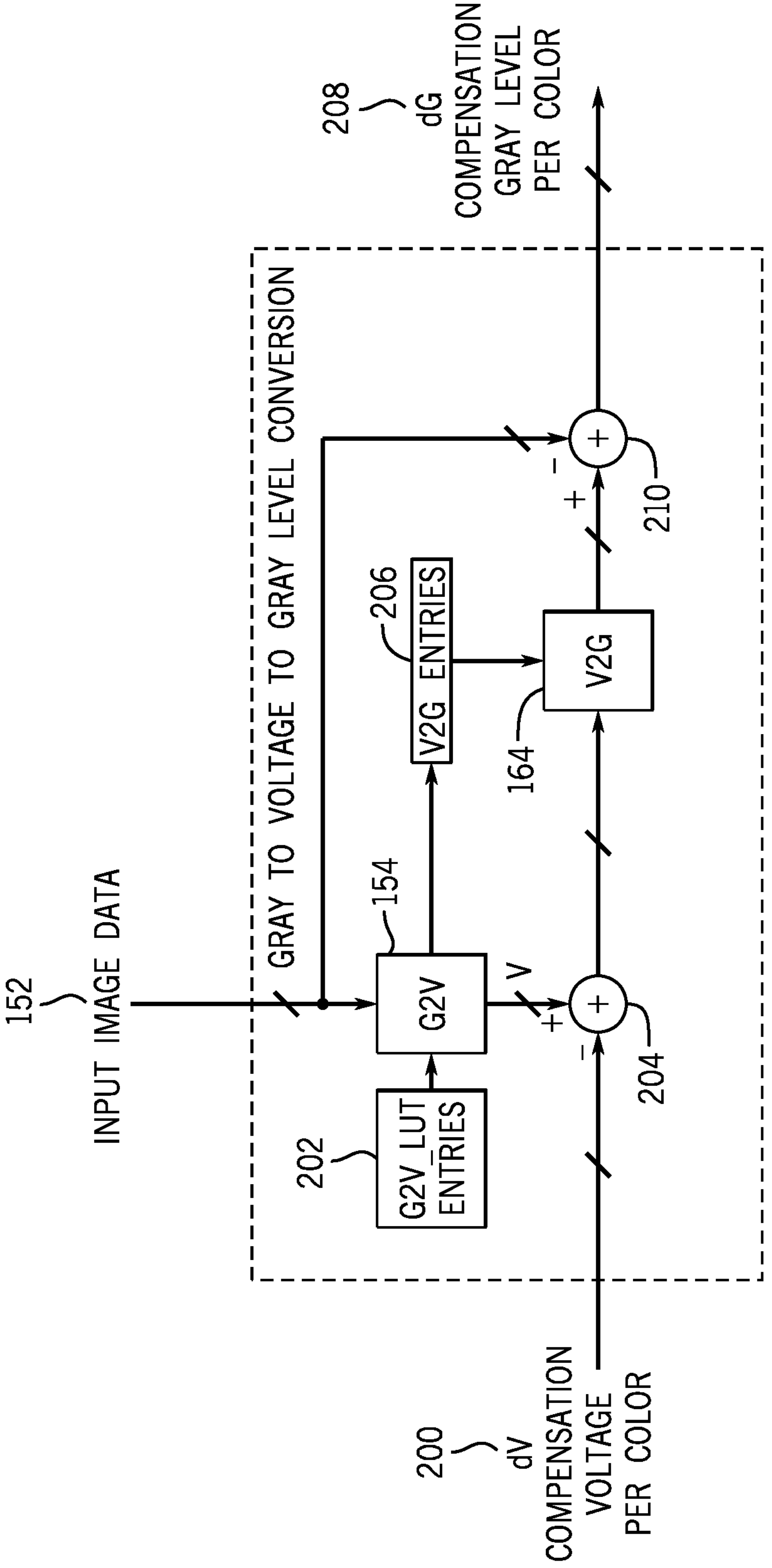
FIG. 11 is a block diagram of voltage-to-gray (V2G) conversion circuitry, in accordance with an embodiment.

FIG. 11 is a block diagram of the V2G conversion circuitry 164, according to an embodiment of the present disclosure. The V2G conversion circuitry 164 may receive the input image data 152 and a compensation voltage (dV) 200, wherein the compensation voltage 200 may be a compensation voltage per color component (e.g., provided by the IR drop compensation circuitry 162). The input image data 152 may be converted to voltage by the G2V conversion circuitry 154 based on a G2V LUT 202. A voltage input V may be output from the G2V conversion circuitry 154, and the voltage input may be combined with the compensation voltage 200 at the adder 204 to generate a value equal to V+dV. The voltage input V may be converted back to a gray level value via the V2G conversion circuitry 164 based on a V2G LUT 206 to generate the value G+dG, wherein G is the input image data 152 and dG is the compensation gray level 208. The compensation gray level 208 may be a compensation per color component. To generate dG, the input image data 152 G may be subtracted by the subtractor 210.

Figure 12:
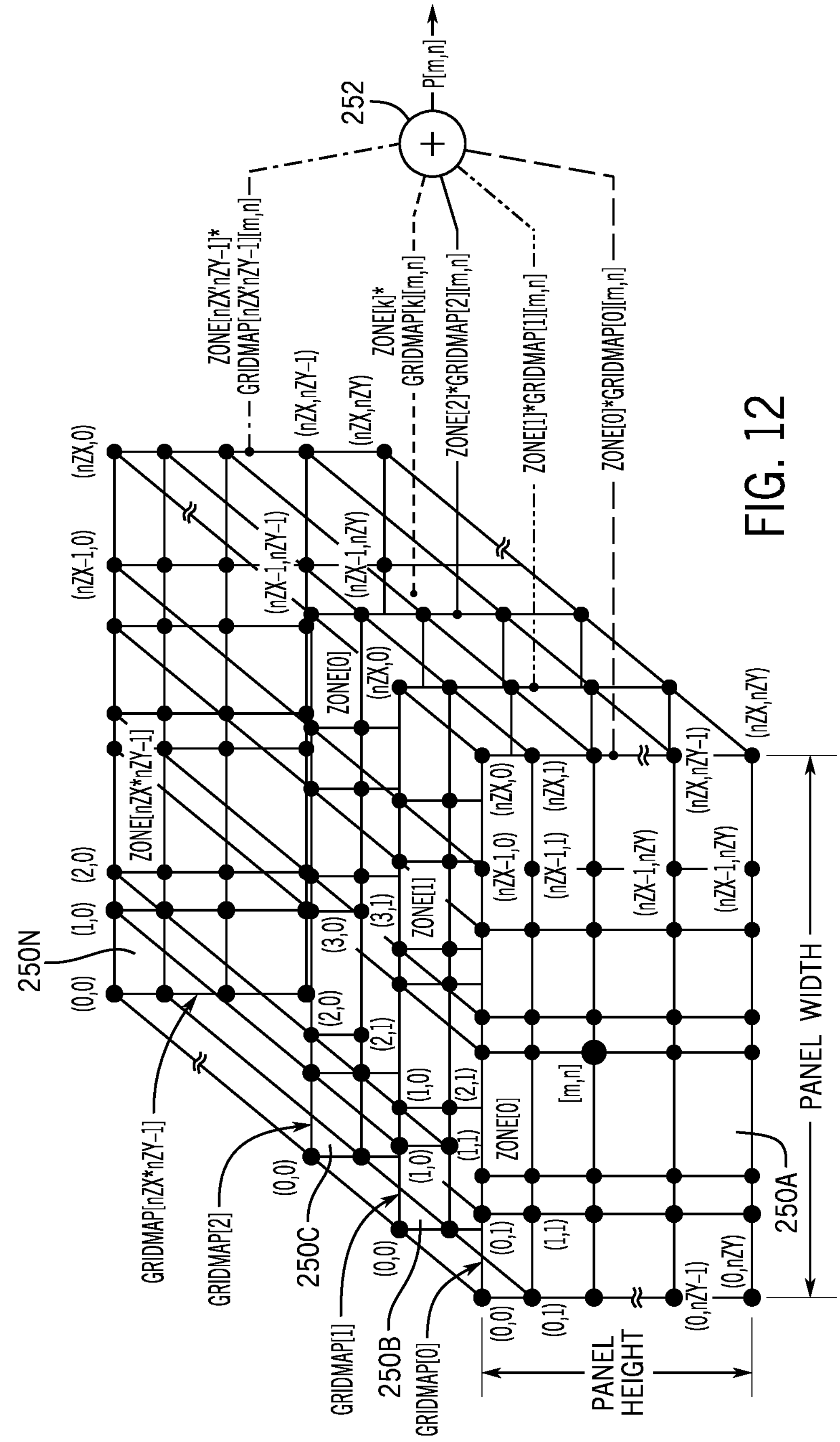
FIG. 12 is a diagram illustrating multiple grid maps, each grid map corresponding to a zone of the grid map, in accordance with an embodiment.

Zone APL for each zone 124 may impact one or more subsequent zones in the same row in a subsequent row. In some instances, zone APL for one zone 124 may impact all other zones of the electronic display 12. For example, a bright region in Zone[0] may affect the display pixels 54 in the last zone 124 of the grid map 120 (e.g., may affect the Zone[nZY'nZX−1]. Due to this spillover, it may be beneficial to generate grid map for each respective zone 124. FIG. 12 is a diagram illustrating multiple grid maps, each grid map corresponding to a zone of the grid map 120, according to embodiments of the present disclosure. FIG. 12 includes the grid maps 250A, 250B, 250C, and 250N (collectively, the grid maps 250). The grid maps 250 may model the IR drop impact of each individual zone on other zones in the grid map 120. The IR drop impact of any one zone 124 may be non-uniform across the electronic display 12. For example, an IR drop impact at Zone[0] may have an impact on all other display pixels 54 in the electronic display 12, and Zone[1] may have an impact on all display pixels 54 in the electronic display 12. However, the impact of the Zone [0] IR drop and the Zone[1] IR drop may be unequal. This may be true even if Zone[0] and Zone[1] have similar or identical APL values. As such, the individual grid maps may be generated and weighted according to their impact on the rest of the electronic display 12.

The grid map 250A may be generated based on the zone APL of Zone[0] and the IR drop impact on all subsequent zones of the electronic display 12 due to the zone APL of Zone[0]. Likewise, the grid map 250B may be generated based on the zone APL of Zone[1], the grid map 250C may be generated based on the zone APL of Zone[2], and the grid map 250N may be based on the zone APL of Zone[n-ZX'nZY−1]. It should be noted that grid maps 250 may be generated for each zone in a grid map. For example, if a grid map of the electronic display 12 includes 20 zones in a column and 10 zones in a row for a total of 200 zones, 200 grid maps may be generated, each corresponding to the zone APL of each individual zone. Each individual grid map 250 may be summed together (e.g., via the adder 252) to generate an IR drop map for the electronic display 12.

II. Emission Profiling and Dynamic Accumulation

Figure 13:
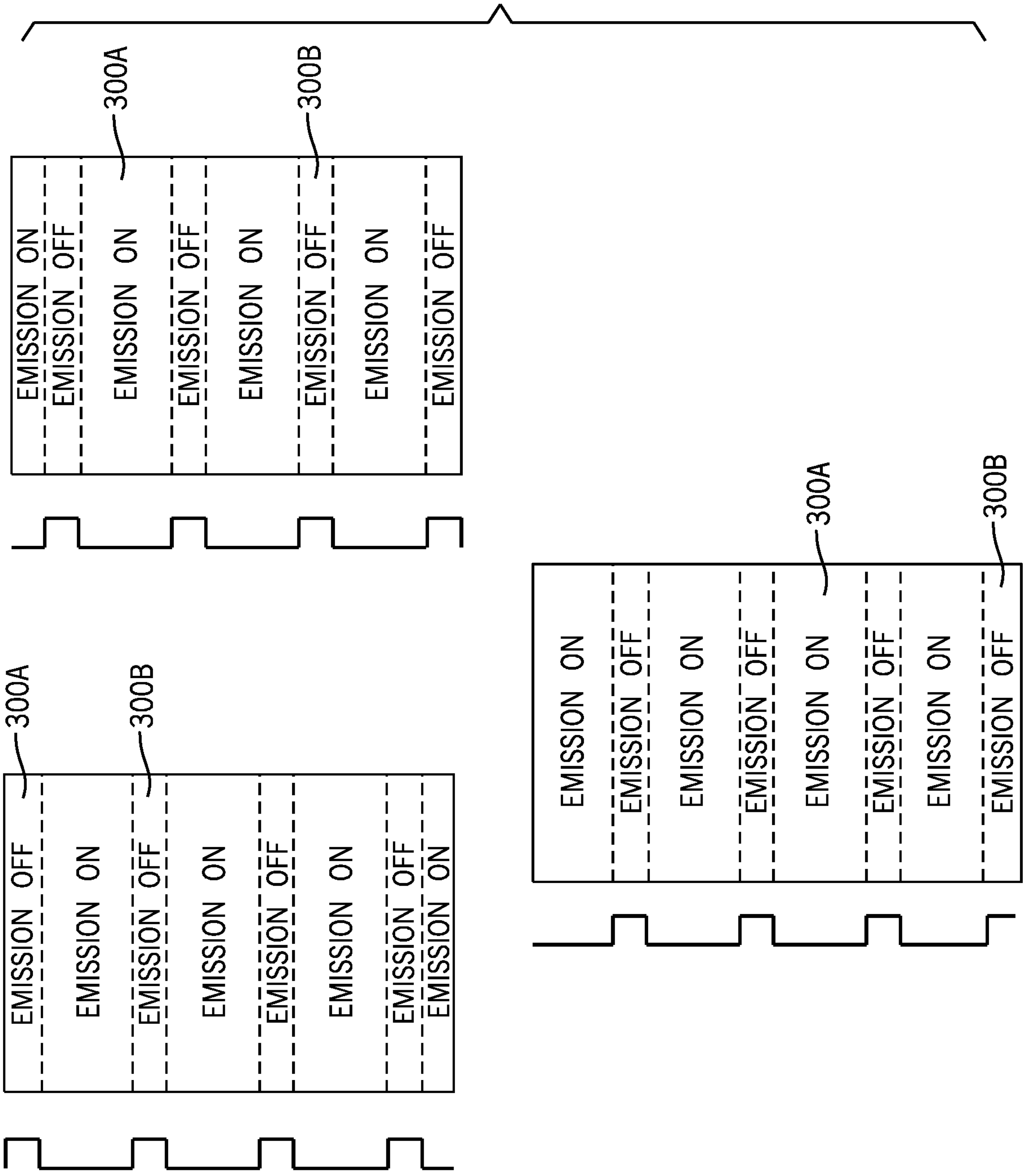
FIG. 13 is an illustration representing an emission profile that may be applied to an image frame being displayed on the electronic display at a given time, in accordance with an embodiment.

FIG. 13 is an illustration representing an emission profile that may be applied to an image frame being displayed on the electronic display at a given time, according to embodiments of the present disclosure. The emission profile may alternately turn emission on (when a row includes an emitting row 300A) and off (when a row includes a non-emitting row 300B). The emission profile may step through a frame, such that the emitting rows 300A and the non-emitting rows 300B alternate throughout the frame. For example, the emitting rows 300A and the non-emitting rows 300B may alternate every subframe. To obtain an accurate current magnitude in each subline and each zone 124, and consequently an accurate IR drop determination across the panel, it may be advantageous to account for the rows that are emitting or not emitting due to the emission profile. It should be noted that, while an emission profile step size (e.g., the number of lines by which each emission pulse steps through a frame) of four may be shown, the step size may be selectable from any appropriate number of step sizes (e.g., a step size value of 1, 2, 4, and so on).

Figure 14:
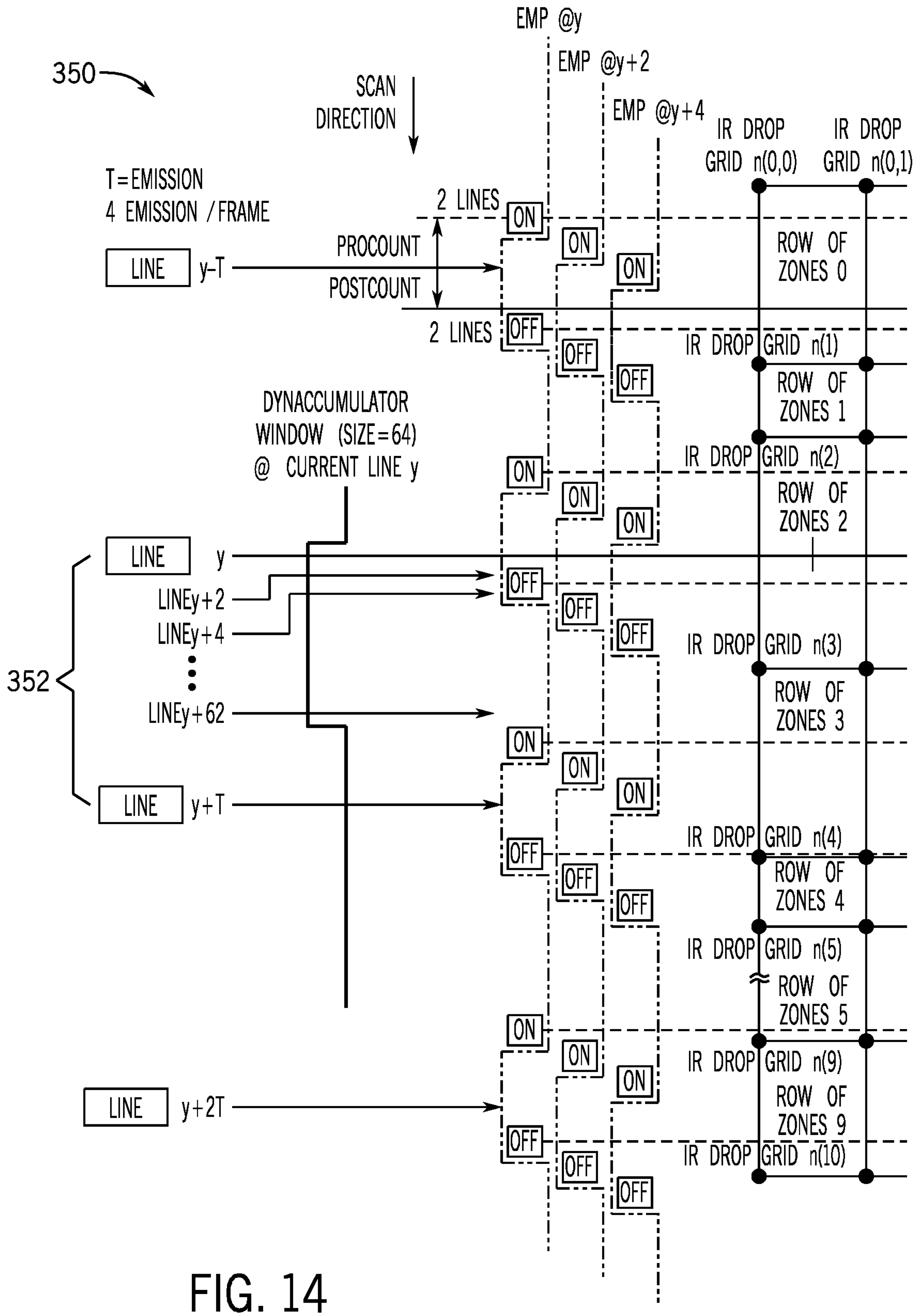
FIG. 14 illustrates operation of a dynamic accumulator implemented to determine APL values for lines of display pixels across the electronic display, in accordance with an embodiment.

FIG. 14 illustrates operation of a dynamic accumulator 350, according to embodiments of the present disclosure. The dynamic accumulator 350 may enable determining of IR drop for the electronic display panel accounting for the emission profile. The dynamic accumulator 350 may determine APL values (e.g., delta APL values) for lines of display pixels 54 across the electronic display 12. The dynamic accumulator 350 may determine the per-line APL values for a portion of the electronic display 12 captured by a rolling emission window 352. The rolling emission window 352 may sample the APL for multiple lines of the display pixels 54 at a given time. For example, the rolling emission window 352 may sample 2 lines, 4 lines, 8 lines, 32 lines, or 64 lines or more to determine APL. Line y represents a line of display pixels 54 that is presently being programmed, line y-T represents a line of display pixels 54 that has previously been programmed with the present frame data, and line y+T and y+2T represent lines that have not yet been programmed with the present frame data, and as such are still programmed with previous frame data. The size of the rolling emission window 352 may include one row of zones 124, two rows of zones 124, or any other appropriate number of rows of zones.

As previously described, the line APL determined for each of the lines of display pixels may include delta line APL, wherein a difference is determined between a previous APL determined with respect to previous frame data and a present APL determined with respect to present frame data.

The dynamic accumulator 350 may account for the emitting and non-emitting lines due to an emission profile applied to the electronic display 12. An emission profile may traverse downward across the electronic display 12, such that the emission profile occurs at a first time period, the emission profile occurs at a second time period, and the emission profile occurs at a third time period. The emission profiles may be referred to as the emission profile. The emission profiles may shift two lines at a time after two lines (e.g., line y and line y+1) have been programmed. That is, the frequency of the emission profile may be equal to the programming frequency of the lines of display pixels 54. However, in some embodiments the frequency of the emission profile may be different than the programming frequency. In some embodiments, the emission profiles may shift one line at a time, four lines at a time, and so on. As the emission profile shifts through the rolling emission window 352, the delta line APL may be determined for each line within the rolling emission window 352 based on whether the lines are emitting or non-emitting until the emission profile has traversed all lines (e.g., all 64 lines) of the rolling emission window 352. In this manner, the dynamic accumulator 350 may enable APL for each line across the electronic display 12 to be determined based on the previous frame data, the present frame data, and an emission profile across the electronic display 12.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device, comprising:

an electronic display comprising a plurality of pixels configured to emit light based on processed image data; and processing circuitry configured to:

receive input image data;

determine average pixel luminance (APL) for each zone of a plurality of zones based on a difference between a first APL associated with a present frame of the input image data and between a second APL associated with a subsequent frame of the input image data;

generate a plurality of current-resistance voltage (IR) drop grid maps for each zone of the plurality of zones, wherein each IR drop grid map is based on the APL for a particular zone of the plurality of zones and an estimated IR drop across each other zone of the plurality of zones due to the APL for that particular zone;

determine, based on accumulating each of the IR drop grid maps, IR drop across the electronic display;

determine an IR drop compensation based on the IR drop across the electronic display; and generate, based on applying the IR drop compensation to the input image data, the processed image data.

2. The electronic device of claim 1, wherein the processing circuitry is configured to determine the APL for each zone of the plurality of zones by determining APL for each subline of a plurality of sublines in each respective zone of the plurality of zones.

3. The electronic device of claim 2, wherein the processing circuitry is configured to determine a delta subline APL value for each subline within each zone of the plurality of zones, wherein each delta subline APL value is determined based on a differential between a first subline APL value corresponding to the present frame of the input image data and a second subline APL value corresponding to the subsequent frame of the input image data.

4. The electronic device of claim 3, wherein the processing circuitry is configured to determine the APL for each zone by accumulating each delta subline APL value in a respective zone to generate a delta zone APL.

5. The electronic device of claim 4, wherein the processing circuitry is configured to generate the plurality of IR drop grid maps based on the delta zone APL for each zone of the plurality of zones.

6. The electronic device of claim 4, wherein the processing circuitry is configured to sum the plurality of IR drop grid maps to determine a panel-level IR drop across the electronic display.

7. The electronic device of claim 1, wherein the processing circuitry is configured to convert the input image data to a pixel voltage, determine the IR drop compensation as a pixel voltage compensation, and sum the pixel voltage and the pixel voltage compensation.

8. The electronic device of claim 7, wherein the processing circuitry is configured to convert the sum of the pixel voltage and the pixel voltage compensation to a sum of the input image data and a compensation gray level via a voltage-to-gray level conversion.

9. The electronic device of claim 8, wherein the processing circuitry is configured to output the pixel voltage compensation by subtracting the input image data from the sum of the input image data and the compensation gray level.

10. The electronic device of claim 1, wherein the plurality of zones comprise rectangular, non-uniform, and non-overlapping zones.

11. The electronic device of claim 1, wherein each zone of the plurality of zones is based on a number of calibration points disposed at each corner of each respective zone.

12. Tangible, non-transitory, computer-readable media, comprising computer-executable instructions that, when executed, cause one or more processors to:

determine, based on first image frame data associated with a present frame displayed on an electronic display, a first average pixel luminance (APL) value for a subline of display pixels in a zone of the electronic display;

determine, based on second image frame data associated with a subsequent frame to be displayed on the electronic display, a second APL value for the subline of display pixels in the zone of the electronic display;

generate, based on a delta between the first APL value and the second APL value, a first delta subline APL value;

determine, based on the first image frame data associated with the present frame, a third APL value for an additional subline of display pixels in the zone of the electronic display;

determine, based on the second image frame data associated with the subsequent frame, a fourth APL value for the additional subline of display pixels in the zone of the electronic display based on the second image frame data associated with the subsequent frame;

generate, based on an additional delta between the third APL value and the fourth APL value, a second delta subline APL value;

accumulate the first delta subline APL value and the second delta subline APL value to generate a delta zone APL value; and determine, based on the delta zone APL value, a current-resistance (IR) drop associated with the zone.

13. The tangible, non-transitory, computer-readable media of claim 12, comprising the computer-executable instructions that, when executed, cause the one or more processors to:

generate an IR drop grid map based on an IR drop across the electronic display due to the IR drop associated with the zone.

14. The tangible, non-transitory, computer-readable media of claim 12, comprising the computer-executable instructions that, when executed, cause the one or more processors to:

determine an additional IR drop associated with an additional zone based on an additional delta zone APL value and a plurality of delta subline APL values associated with the additional zone.

15. The tangible, non-transitory, computer-readable media of claim 14, comprising the computer-executable instructions that, when executed, cause the one or more processors to:

generate an additional IR drop grid map based on the additional IR drop across the electronic display due to the additional IR drop associated with the additional zone.

16. The tangible, non-transitory, computer-readable media of claim 15, comprising the computer-executable instructions that, when executed, cause the one or more processors to:

accumulate the IR drop grid map and the additional IR drop grid map to determine a per-panel IR drop across the electronic display.

17. An electronic device, comprising:

an electronic display comprising a plurality of pixels configured to emit light based on processed image data; and processing circuitry configured to:

receive input image data;

generate a plurality of current-resistance voltage (IR) drop grid maps based on the input image data, each IR drop grid map corresponding to an IR drop of a particular zone of a plurality of zones and an estimated IR drop impact of the particular zone across the plurality of zones based on a delta average pixel luminance (APL) value for the particular zone, the delta APL value for particular zone comprising a difference between a first APL for the particular zone associated with a first frame of the input image data and between a second APL associated for the particular zone associated with a second frame of the input image data;

determine IR drop across the electronic display based on the plurality of IR drop grid maps;

determine an IR drop compensation based on the IR drop across the electronic display; and generate, based on applying the IR drop compensation to the input image data, the processed image data.

18. The electronic device of claim 17, wherein the processing circuitry is configured to determine the IR drop across the electronic display by accumulating the plurality of IR drop grid maps.

19. The electronic device of claim 17, comprising memory configured to store a value of the second APL, wherein the processing circuitry is configured to determine, based on the value of the second APL, an additional delta APL value for an additional frame of additional input image data.

20. The electronic device of claim 17, wherein the processing circuitry is configured to identify, based on a plurality of calibration points corresponding to intersections between one or more rows of pixels and one or more columns of pixels on the electronic display, the plurality of zones.

* * * * *